(12) United States Patent
Hosomizo

(10) Patent No.: US 11,880,619 B2
(45) Date of Patent: Jan. 23, 2024

(54) COMPUTER PRODUCT STORING SUPPORTING PROGRAM FOR MANAGING COMMON PRINT SETTINGS FOR EACH IDENTIFIED PRINTER

(71) Applicant: Brother Kogyo Kabushiki Kaisha, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/184,817

(22) Filed: Mar. 16, 2023

(65) Prior Publication Data
US 2023/0305777 A1 Sep. 28, 2023

(30) Foreign Application Priority Data
Mar. 28, 2022 (JP) .................. 2022-052259

(51) Int. Cl.
*G06F 3/12* (2006.01)

(52) U.S. Cl.
CPC .......... *G06F 3/1257* (2013.01); *G06F 3/1205* (2013.01); *G06F 3/126* (2013.01); *G06F 3/1258* (2013.01); *G06F 3/1284* (2013.01)

(58) Field of Classification Search
CPC ...... G06F 3/1257; G06F 3/1258; G06F 3/126; G06F 3/1205; G06F 3/1284
See application file for complete search history.

(56) References Cited

U.S. PATENT DOCUMENTS

| | | | | |
|---|---|---|---|---|
| 8,482,775 | B2 * | 7/2013 | Natori | G06F 3/1254 |
| | | | | 358/1.15 |
| 9,122,428 | B2 * | 9/2015 | Aritomi | G06F 3/1287 |
| 11,064,088 | B2 * | 7/2021 | Kunimatsu | G06F 3/1239 |
| 11,086,578 | B2 * | 8/2021 | Kunimatsu | G06F 3/1234 |
| 11,531,502 | B2 * | 12/2022 | Hosomizo | G06F 3/126 |
| 2011/0063659 | A1 * | 3/2011 | Sakura | G06F 3/1205 |
| | | | | 358/1.15 |

(Continued)

FOREIGN PATENT DOCUMENTS

| | | | | |
|---|---|---|---|---|
| JP | 2017-134718 A | | 8/2017 | |
| JP | 2020-123243 A | | 8/2020 | |
| JP | 2023073347 A | * | 5/2023 | ........... G06F 3/1204 |

*Primary Examiner* — Scott A Rogers
(74) *Attorney, Agent, or Firm* — BURR PATENT LAW, PLLC

(57) ABSTRACT

A non-transitory storage medium stores a supporting program configured to support a printing program of an operating system of the information processing apparatus. A print queue for each of a plurality of printers is provided in the operating system. The printing program is capable of making a request to the supporting program for processing in a state in which the print queue for any one of the plurality of printers is selected. The supporting program causes the information processing apparatus to execute identifying a printer of the plurality of printers to which processing is requested, reading setting data into which a common setting value indicating a setting value of a print setting commonly used by the plurality of printers is written, and changing a setting value of the print setting of an identified printer based on the common setting value written into the read setting data.

10 Claims, 10 Drawing Sheets

(56) References Cited

U.S. PATENT DOCUMENTS

| | | | |
|---|---|---|---|
| 2017/0223210 A1 | 8/2017 | Yamada | |
| 2018/0088882 A1* | 3/2018 | Omura | G06F 3/1204 |
| 2018/0373468 A1* | 12/2018 | Saigusa | G06F 3/1228 |
| 2020/0097229 A1* | 3/2020 | Nakamura | G06F 21/608 |
| 2020/0249879 A1 | 8/2020 | Hosomizo | |
| 2023/0236773 A1* | 7/2023 | Hosomizo | G06F 3/1205 |
| | | | 358/1.13 |

* cited by examiner

| SETTING ITEM NAME | DEFAULT VALUE |
|---|---|
| SUPPLYING TRAY | TRAY 2 |
| PAPER TYPE | PLAIN PAPER |
| SHEET SIZE | A4 SIZE |
| COLOR MODE | COLOR |
| DUPLEX PRINTING | DUPLEX PRINTING |
| PAGE-LAYOUT PRINTING | 4 in 1 |
| SAVING PRINTING | ON |
| WATERMARK | VALID (IN-COMPANY USE) |
| PIN SETTING | VALID (1234) |

202

| SETTING ITEM NAME | DEFAULT VALUE |
|---|---|
| SUPPLYING TRAY | MANUAL FEED TRAY |
| PAPER TYPE | PLAIN PAPER |
| SHEET SIZE | A3 SIZE |
| COLOR MODE | COLOR |
| DUPLEX PRINTING | DUPLEX PRINTING |
| PAGE-LAYOUT PRINTING | STANDARD (1 in 1) |
| SAVING PRINTING | OFF |
| PIN SETTING | INVALID |
| STAPLING | ON |

203

| SETTING ITEM NAME | DEFAULT VALUE |
|---|---|
| SUPPLYING TRAY | TRAY 1 |
| PAPER TYPE | PLAIN PAPER |
| SHEET SIZE | A4 SIZE |
| DUPLEX PRINTING | SIMPLEX PRINTING |
| PAGE-LAYOUT PRINTING | STANDARD (1 in 1) |

| SETTING ITEM NAME | COMMON SETTING VALUE |
|---|---|
| SHEET SIZE | A4 SIZE |
| COLOR MODE | COLOR |
| DUPLEX PRINTING | DUPLEX PRINTING |
| PAGE-LAYOUT PRINTING | 2 in 1 |
| SAVING PRINTING | ON |
| PIN SETTING | VALID (1234) | ns # COMPUTER PRODUCT STORING SUPPORTING PROGRAM FOR MANAGING COMMON PRINT SETTINGS FOR EACH IDENTIFIED PRINTER

REFERENCE TO RELATED APPLICATIONS

This application claims priority from Japanese Patent Application No. 2022-052259 filed on Mar. 28, 2022. The entire content of the priority application is incorporated herein by reference.

BACKGROUND ART

The following disclosure relates to a non-transitory storage medium storing a supporting program that supports a control of a printer.

There has been known a conventional configuration, as a technique of controlling a printer by an information processing apparatus such as a PC, in which a printer driver is installed on the information processing apparatus, print data is generated by the printer driver, and the generated print data is transmitted to the printer. Moreover, there has been known a technique in which a printer queue is provided for each controlled printer by an operating system in the information processing apparatus and a setting value of a print setting settable in each printer is managed in each print queue.

DESCRIPTION

A technique in which a general-purpose printing program normally installed on the information processing apparatus controls the external printer without using a printer driver has been commercialized recently. In this technique, when the OS detects the external printer, the OS establishes an association between the standard general-purpose printing program of the OS and the external printer. After that, in a case where an instruction for a print execution to the external printer is received, printing by the standard general-purpose printing program of the OS becomes executable without using the printer driver.

Even in a case where the printer is controlled by the above described standard general purpose printing program of the OS, the print queue is provided for each printer in the same manner as in the case of the printer driver. As a result of this, when a user hopes to use a common setting value settable to a print setting in each of a plurality of printers, the user needs to change the setting value of the print setting managed in each print queue. Accordingly, it takes much time.

An aspect of the disclosure relates to a non-transitory storage medium storing a supporting program capable of decreasing time for setting a common setting value to a print setting in each of a plurality of printers from an information processing apparatus.

In one aspect of the disclosure, a non-transitory storage medium stores a supporting program executable by a computer of an information processing apparatus. The supporting program is configured to support a printing program of an operating system of the information processing apparatus, the supporting program conforming to a printer connected to the information processing apparatus. The information processing apparatus is capable of controlling a plurality of printer. A print queue for each of the plurality of printers, which are to be controlled, is provided in the operating system. The printing program of the operating system is capable of making a request to the supporting program for processing in a state in which the print queue for any one of the plurality of printers is selected. When executed by the computer, the supporting program causes the information processing apparatus to execute, when being requested for processing from the printing program of the operating system, identifying the printer of the plurality of printers to which the processing is requested, reading setting data into which a common setting value indicating a setting value of a print setting commonly used by the plurality of printers is written, and changing a setting value of the print setting of the identified printer based on the common setting value which has been written into the read setting data.

The objects, features, advantages, and technical and industrial significance of the present disclosure will be better understood by reading the following detailed description of the embodiments, when considered in connection with the accompanying drawings, in which:

FIG. 2A is a conceptual view of print queues;

FIG. 2B is a conceptual view of a common setting file;

There will be described in details below a personal computer 1, which may be hereinafter referred to as the PC 1, using a supporting program of the present embodiment, with reference to the drawings. The present disclosure discloses the supporting program executed in the PC 1.

First Embodiment

Figure 1:
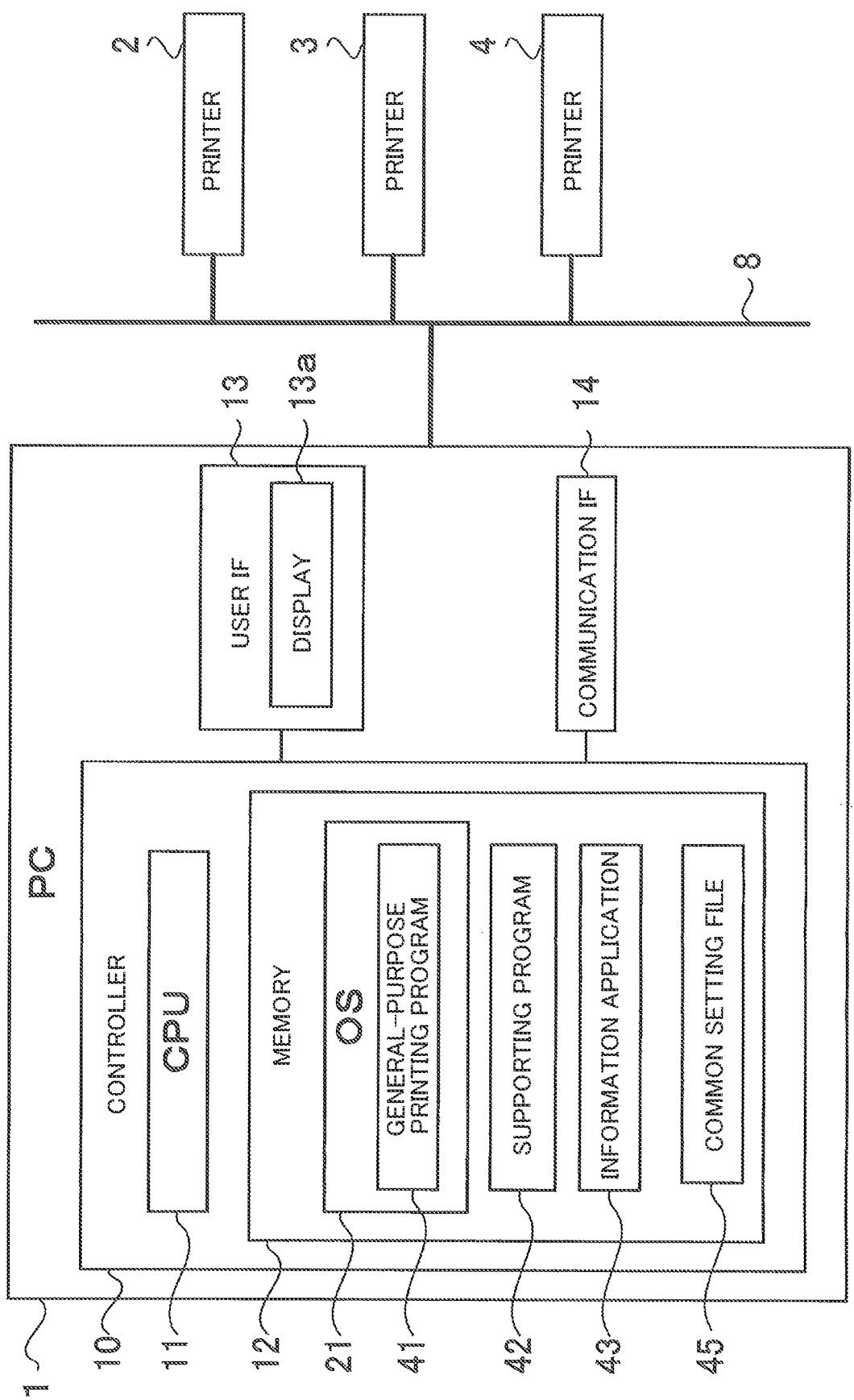
FIG. 1 is a block diagram illustrating an outline of an electric configuration of a PC.

As illustrated in FIG. 1, the PC 1 of the present embodiment includes a controller 10 having a CPU 11 and a memory 12. The PC 1 is an example of an information processing apparatus. The CPU 11 is an example of a computer. Moreover, the PC 1 includes a user interface 13, which may be hereinafter referred to as the user IF 13, and a communication interface 14, which may be hereinafter referred to as the communication IF 14. The user IF 13 and the communication IF 14 are electrically connected to the controller 10. It is noted that the controller 10 in FIG. 1 is a general term for hardware and software used in a control of the PC 1, and the controller 10 is not limited to a single piece of hardware actually existing in the PC 1.

The CPU 11 executes various kinds of processes in accordance with various kinds of programs read from the memory 12 or based on operations by a user. The various kinds of programs and various kinds of data are stored in the memory 12. The memory 12 is also used as a work area at which the various kinds of processes are executed. A buffer in the CPU 11 is also an example of a memory. It is noted that the example of the memory 12 is not limited to a ROM, a RAM, a HDD and so on each built into the PC 1, and the example of the memory 12 may be a storage medium readable and writable by the CPU 11 such as a CD-ROM, a DVD-ROM.

The user IF 13 includes hardware that displays a screen for notifying information to the user and hardware that receives operations by the user. It is noted that the user IF 13 may be a combination of a display 13a capable of displaying information and a mouse, a keyboard and so on each having a function of receiving an input. The user IF 13 may be a touch panel having the display 13a and a function of receiving an input.

The communication IF 14 includes hardware configured to communicate with an external device such as printers 2, 3, 4. Communication standard of the communication IF 14 includes Ethernet, Wi-Fi, USB and so on. Each of Ethernet, Wi-Fi, USB is a registered trademark. The PC 1 may be connectable to the Internet via the communication IF 14. Moreover, the PC 1 may include a plurality of communication IFs 14 respectively conforming to a plurality of kinds of the communication standard.

As illustrated in FIG. 1, an operating system 21 including a general-purpose printing program 41, a supporting program 42 and various kinds of application programs, which may be hereinafter referred to as the application, are stored in the memory 12 of the PC 1. The operating system 21 may be hereinafter referred to as the OS 21. The OS 21 is, for example, Windows, macOS, Linux, iOS or Android. Each of Windows, macOS, Linux, iOS and Android is a registered trademark. The general-purpose printing program 41 is an example of a printing program. The supporting program 42 is an example of a supporting program.

As various kinds of applications, for example, an information application 43 is installed on the PC 1 of the present embodiment. The information application 43 is, for example, a map application, a calendar application, or a browser application. The information application 43 has a function of causing the PC to display various kinds of information on the display 13a in accordance with requests from the user. The information application 43 is an example of an application program. It is noted that the information application 43 itself may not include a function of causing the printer to print the displayed information.

The general-purpose printing program 41 is a standard program of the OS 21 provided together with the OS 21, and the general-purpose printing program 41 has a function of causing the printers 2, 3, 4 and so on to print information which is displayed on the display 13a by the information application 43 and so on. The general-purpose printing program 41 of the present embodiment is a program having a function of generating intermediate data based on image data of an image to be printed. The general-purpose printing program 41 supports functions commonly available for various kinds of models of printers supplied by various vendors. Different from a specific printer driver of each of the various kinds of models of the printers, the general-purpose printing program 41 does not support all of inherent functions of each of the various kinds of models of printers, and the general-purpose printing program 41 only supports general-purpose functions of each of the various kinds of models of the printers.

The supporting program 42 is a program or a program group configured to execute processes based on an instruction from the OS 21, and the execution by the supporting program 42 is accompanied by execution of processes by the general-purpose printing program 41. The supporting program 42 is a program configured to support a control of hardware which is to be controlled. The supporting program 42 of the present embodiment conforms to the model of the printers 2, 3, 4 connected to the PC 1, and, for example, the supporting program 42 is activated by the general-purpose printing program 41 in response to receipt of an instruction for causing any one of the printer 2, 3, 4 to print by using the general-purpose printing program 41. The supporting program 42 is called as a print supporting application, the abbreviated name of which is PSA, or a hardware supporting application, the abbreviated name of which is HSA, for example.

It is noted that the supporting program 42 may be a combination of a plurality of programs each receiving an execution order, and the supporting program 42 may be a single program capable of executing different processes in accordance with different orders. Moreover, the supporting program 42 may be a program provided for each of various types of the printers by the vendor of each of the printers. For example, each of a supporting program for an ink-jet printer and a supporting program for a laser printer may be provided. The supporting program is not limited to be provided for each of the various types of the printer, that is, a supporting program may be provided for each of the various kinds of models of the printers or may be provided for each of a plurality of series of the various kinds of models of the printers.

The PC 1 is connected to the printer registered in the OS 21 so as to be communicated with each other, and the registered printer becomes a printer to be controlled by the PC 1. In the present embodiment, the PC 1 and the printers 2, 3, 4 are connected to a network 8 so as to be communicated with each other. The PC 1 obtains printer information from the printers 2, 3, 4 via the network 8 by the OS 21, and stores the printer information into the memory 12. Accordingly, the printers 2, 3, 4 become printers to be controlled by the PC 1.

Each of the printers 2, 3, 4 is a device having at least a printing function and a communicating function. Each of the printers 2, 3, 4 receives print data and a print setting from external devices such as the PC 1, and performs printing in accordance with the print setting. Examples of setting items of the print setting include a number of copies, an orientation of printing, printing quality, a size of the sheet, selection of the sheet tray, selection of kinds of the sheet, duplex printing, color printing, borderless printing, page-layout printing (N in 1), saving printing for saving coloring agents, and a setting of PIN used at the user authentication in printing. The setting items of the print setting may be setting items related to a post-processing that is a process for the printed object such as stapling in which the printed objects are stapled with a staple.

As illustrated in FIG. 2A, the OS 21 provides a print queue for each of the printers to be controlled. In the OS 21 of the present embodiment, a print queue 201 for the printer 2, a print queue 202 for the printer 3, and a print queue 203 for the printer 4 are provided. The OS 21 stores print jobs which are transmitted to the printers by using the print queues. Moreover, for example, the printer information corresponding to the printer is stored in the print queue. Moreover, for example, the current setting value of each of the setting items of the print setting supported by the corresponding printer is stored in the print queue.

Returning to FIG. 1, for example, in a case where a new printer is connected to the PC 1, the OS 21 of the PC 1 can download a proper supporting program from a server and so on and install the downloaded supporting program on the PC 1 in accordance with a type and a model of the connected printer. The OS 21 associates identification information of the installed supporting program 42 with the printer information of the newly connected printer and stores the associated identification information into the memory 12. The supporting program 42 of the present embodiment conforms to each of models of the printers 2, 3, 4. The OS 21 stores the printer information of each of the printers 2, 3, 4 such that the printer information and the identification information of the supporting program 42 are associated with each other, and when any one of the printers 2, 3, 4 is selected, the supporting program 42 is activated by the OS 21 or the general purpose printing program 41.

The general purpose printing program 41 displays, for example, the general purpose print setting screen on the display 13a, and can receive the print setting of functions supported by the general purpose printing program 41 and selection of the printer. Moreover, the supporting program 42 displays a details setting screen on the display 13a, and can receive the print setting dedicated to each of the printers. The details setting screen may receive the print setting of functions supported by the general purpose printing program 41. The general purpose print setting screen and the details setting screen are examples of a print setting screen.

Moreover, as illustrated in FIG. 1, the PC 1 stores a common setting file 45 in the memory 12. As illustrated in FIG. 2B, the common setting file 45 stores a common setting value of each of the setting items. The common setting value is information indicating the setting value of the print setting commonly used in the plurality of printers. The common setting value corresponds to, for example, a setting value of a standard setting item which is supportable by the general purpose printing program 41, such as a sheet size setting, a color/monochrome setting, a duplex/simplex setting. Moreover, the common setting value may include, for example, the setting value of setting items based on the function dedicated to the printer, such as the saving printing, watermarking, or the setting of PIN (authentication information).

The common setting file 45 is a file used by the supporting program 42, and may be stored in a predetermined area in the memory 12 with a predetermined file name. A path of the common setting file 45 which is to be read may be registered in the supporting program 42. The common setting file 45 may be a text file, or a file having a determined format such as j son, csv or xml. The common setting file 45 is set in a common-setting-value setting process, which will be described below. The common setting file 45 is an example of setting data.

Next, there will be described steps of printing including operations of the supporting program 42 in the present embodiment and executed by each of the programs in a case where printing is selected in the information application 43 with reference to a sequence of steps illustrated in FIG. 3. It is noted that, in the sequences of steps in FIG. 3 and in other sequences of steps, which will be described below, there will be described operations performed in a case where the supporting program 42 conforming to each of the printers 2, 3, 4 has been installed on the PC 1.

It is noted that each of steps of processes and steps in the flowcharts in the present embodiment basically indicates processes performed by the CPU 11 in accordance with orders described in the programs such as the supporting program 42. The processes performed by the CPU 11 include a hardware control using an API of the OS 21. In the present disclosure, there will be described operations of each of the programs, and a detailed explanation of the OS 21 is dispensed with. Moreover, "obtainment" is used as a concept not requiring a request.

At the beginning of steps, the user activates the information application 43 at A01. At A02, the information application 43 causes the PC 1 to display an information screen including various kinds of information on the display 13a in response to the instruction from the user. When printing is selected on the information screen which is being displayed at A03, the information application 43 transmits a displaying request and data of the information screen to the general purpose printing program 41 of the OS 21 at A04.

Figure 4:
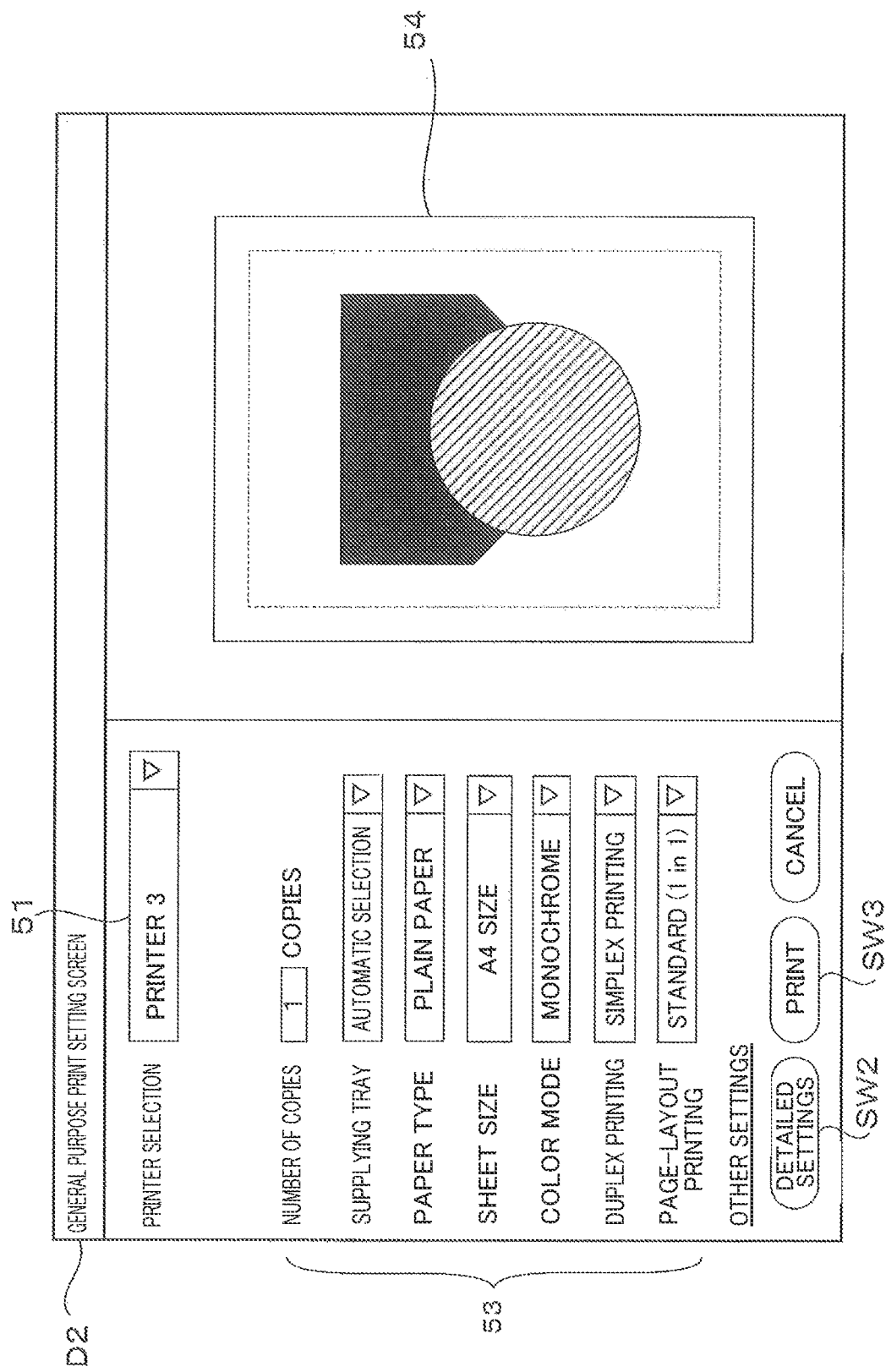
FIG. 4 is a view illustrating an example of a general purpose print setting screen.

At A06, the general purpose printing program 41 causes the PC 1 to display a general purpose printing setting screen on the display 13a in response to receipt of the displaying request. The general purpose printing setting screen is a screen configured to receive an instruction of the print setting and an instruction of a print execution. As illustrated in FIG. 4, for example, a general purpose printing setting screen D2 includes a printer selecting column 51 that receives a selection of the printer, a print setting column 53 that receives various kinds of designations of the print setting, a preview area 54 that illustrates an image of the information screen which is to be printed, a detailed setting button SW2 that receives an instruction for setting detailed print setting, and a printing button SW3 that receives the instruction for the print execution.

In the print setting column 53, a parameter setting can be received in a state in which the print setting is displayed on the print setting column 53 by the general-purpose printing program 41. Examples of setting items which can be set via the print setting column 53 include a number of copies, kinds of the sheet, selection of the sheet tray, a size of the sheet, duplex printing, a color mode, and page-layout printing. Moreover, examples of setting items which can be set via the print setting column 53 may include an orientation of printing, printing quality (resolution), stapling, a printing area, kinds of printing sheet, borderless printing, and enlarging-or-reducing printing. To make the print setting easy, only main setting items may be displayed on the print setting column 53 and other setting items may be displayed when an operation related to the other setting is inputted. The print setting column 53 may be displayed so as to include setting items solely dedicated to each of the printers 2, 3, 4.

Figure 3:
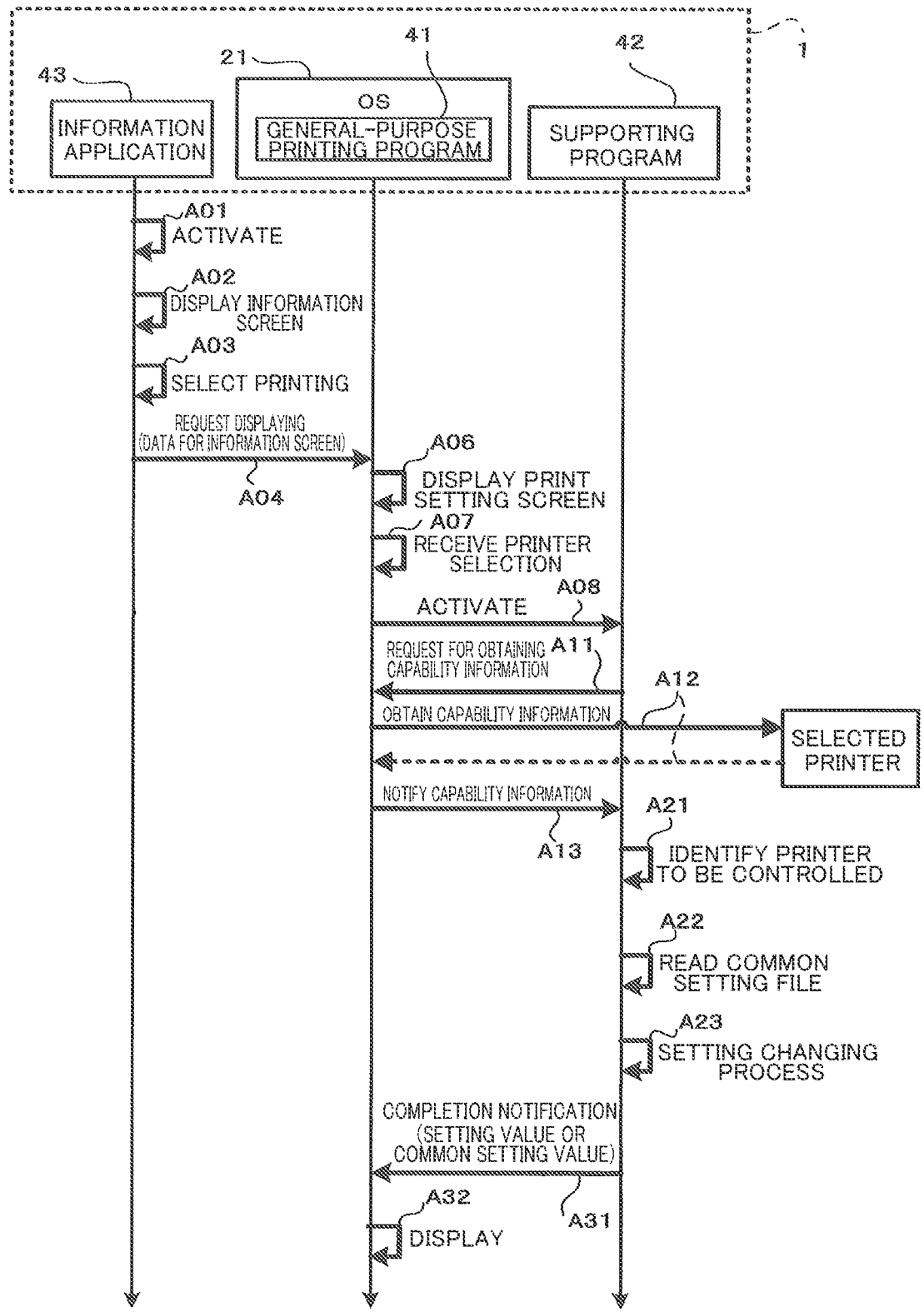
FIG. 3 is a sequence of steps performed in a case where printing is selected.

As illustrated in FIG. 4, the user can select the printer by performing an operation to the printer selecting column 51 on the general purpose printing setting screen D2 which is being displayed at A07 in FIG. 3. The printers registered in the OS 21 are displayed on the printer selecting column 51 so as to be selectable. In a case where the printer selected in the printer selecting column 51 is any one of the printers 2, 3, 4, the general purpose printing program 41 activates the supporting program 42 conforming to the selected one of the printers 2, 3, 4, and transmits a request for a process corresponding to the selection of the printer at A08. At A08, the general purpose printing program 41 passes information related to the selected printer and information related to the print setting being set at the timing of the selection of the printer to the supporting program 42.

It is noted that, for example, in a case where the printer 2 is set to the printer usually used in the OS 21, as illustrated in FIG. 4, the general-purpose printing program 41 displays, at A06, the general purpose print setting screen D2 in a state in which the printer 2 is being selected, and the general-purpose printing program 41 activates the supporting program 42, at A08. That is, the printer 2 is automatically selected by the OS 21, and the general-purpose printing program 41 performs the process of A08 based on the information of the selected printer 2. In this case, the user does not need to perform the operation of A07.

It is noted that the information application 43 may cause the PC 1 to display the general purpose print setting screen D2 on the display 13a instead of displaying the general purpose print setting screen D2 by the general-purpose printing program 41. In this case, the information application 43 activates the general-purpose printing program 41 in response to the selection of printing at A03, obtains data of an image for displaying the image on the general purpose print setting screen D2 from the general-purpose printing program 41, and causes the PC 1 to display the general purpose print setting screen D2 on the display 13a. Then, the information application 43 passes the information related to the selected printer 2 to the general-purpose printing program 41 in accordance with, for example, a state in which the printer 2 is being selected or a state in which the printer 2 is selected at A07. As a result of this, the general-purpose printing program 41 activates the supporting program 42 conforming to the printer 2 at A08.

At A11, the supporting program 42 transmits to the OS 21 a request for capability information indicating capability of the printer in response to the activation of the supporting program 42. The OS 21 transmits an obtaining request for obtaining the capability information to the printer selected on the general purpose print setting screen D2 in response to receipt of the request from the supporting program 42, and the OS 21 obtains the capability information from the selected printer at A12. The OS 21 passes the capability information obtained from the selected printer to the supporting program 42 at A13. The process at A13 is an example of a capability obtaining process.

The OS 21 communicates with the selected printer over communication in accordance with, for example, the IPP (Internet Printing Protocol). It is noted that the supporting program 42 may directly obtain, from the selected printer, the capability information by using, for example, MIB (Management Information Base), instead of transmitting the request to the OS 21.

The capability information obtained from the selected printer includes information of parameters settable as the print settings. Moreover, the capability information includes information indicating a combination of proper print settings. Moreover, the capability information includes, for example, status information, information related to a remaining amount of consumables, information related to trays mounted on the selected printer, sheet information related to sheets set on each of the trays, and information related to executable printing resolutions. Moreover, the selected printer may have functions, of printing based on the processed data of images processed based on the received print job, such as a function of page-integrating printing such as N in 1, a function of composite printing such as watermarking and a function of saving printing for saving coloring agents. In a case where there is the function of the image processing executable by the selected printer, the selected printer may pass the information related to the function, as the capability information, to the OS 21.

The supporting program 42 stores the obtained capability information in the memory 12 in a state in which the capability information and the printer information are associated with each other, and may omit the processes at A11-A13 in and after the next routine. The supporting program 42 may store the capability information in the memory 12 by obtaining the capability information again after a predetermined period of time has passed.

At A21, the supporting program 42 identifies the printer which is to be processed based on the request transmitted at A08. That is, the supporting program 42 identifies one printer, which performs printing, of the printers 2, 3, 4 each connected to the PC 1. For example, the supporting program 42 requests a transmission of printer identifying information of the selected printer to the general purpose printing program 41, and identifies the printer based on the printer identifying information. The supporting program 42 may receive the printer identifying information from the general purpose printing program 41 when the request at A08 is transmitted, and may identify the printer based on the printer identifying information. Moreover, in a case where the capability information notified at A13 includes the printer information, the supporting program 42 may identify the printer based on the printer information. The process at A21 is an example of an identification process.

The supporting program 42 reads the common setting file 45 from the memory 12 at A22. Then, the supporting program 42 executes a setting changing process at A23. The setting changing process is a process of changing the print setting from the current setting value of the print setting received via the general purpose printing setting screen D2, that is, the setting value of the print setting set in the print queue for the printer which is being selected, to the common setting value written into the common setting file 45. The process at A22 is an example of a reading process. The process at A23 is an example of a changing process. There will be described the setting changing process with reference to a flowchart illustrated in FIG. 5. The processes illustrated in FIG. 5 are executed by the CPU 11.

The CPU 11 verifies, at 51, the setting values of the print setting that have been set to the printer queue in the printer identified at A21 and the common setting values of the common setting file 45 that have been read at A22, and the CPU 11 determines whether the setting values of the print setting are entirely identical with the common setting values of the common setting file 45 at S2. For example, in a case where the setting values of the print setting are set in a state in which the printer is being selected on the general purpose printing setting screen D2, the setting values of the print setting are set to the print queue for the selected printer. In a case where the setting values set to the print queue for the selected printer include all the common setting values included in the common setting file 45 illustrated in FIG. 2B, the CPU 11 determines that the setting values of the print setting are entirely identical with the common setting values (S2: YES). In this case, as illustrated in FIG. 5, the CPU 11 ends the setting changing process without changing the print setting from the setting values of the print setting in the print queue 201 to the common setting values.

On the other hand, in a case where the setting values of the print setting set to the printer queue in the printer identified at A21 does not include any one of the common setting values included in the common setting file 45 illustrated in FIG. 2B, the CPU 11 determines that the setting values of the print setting set in the printer queue are not identical with the common setting values (S2: NO). For example, in a case where the setting value "A3 SIZE" is set to the setting item "SHEET SIZE" on the general purpose printing setting screen D2, the setting value "A3 SIZE" is different from the common setting value "A4 SIZE" of "SHEET SIZE" illustrated in FIG. 2B. In this case, the CPU 11 determines that the setting values of the print setting are not identical with the common setting values.

Figure 5:
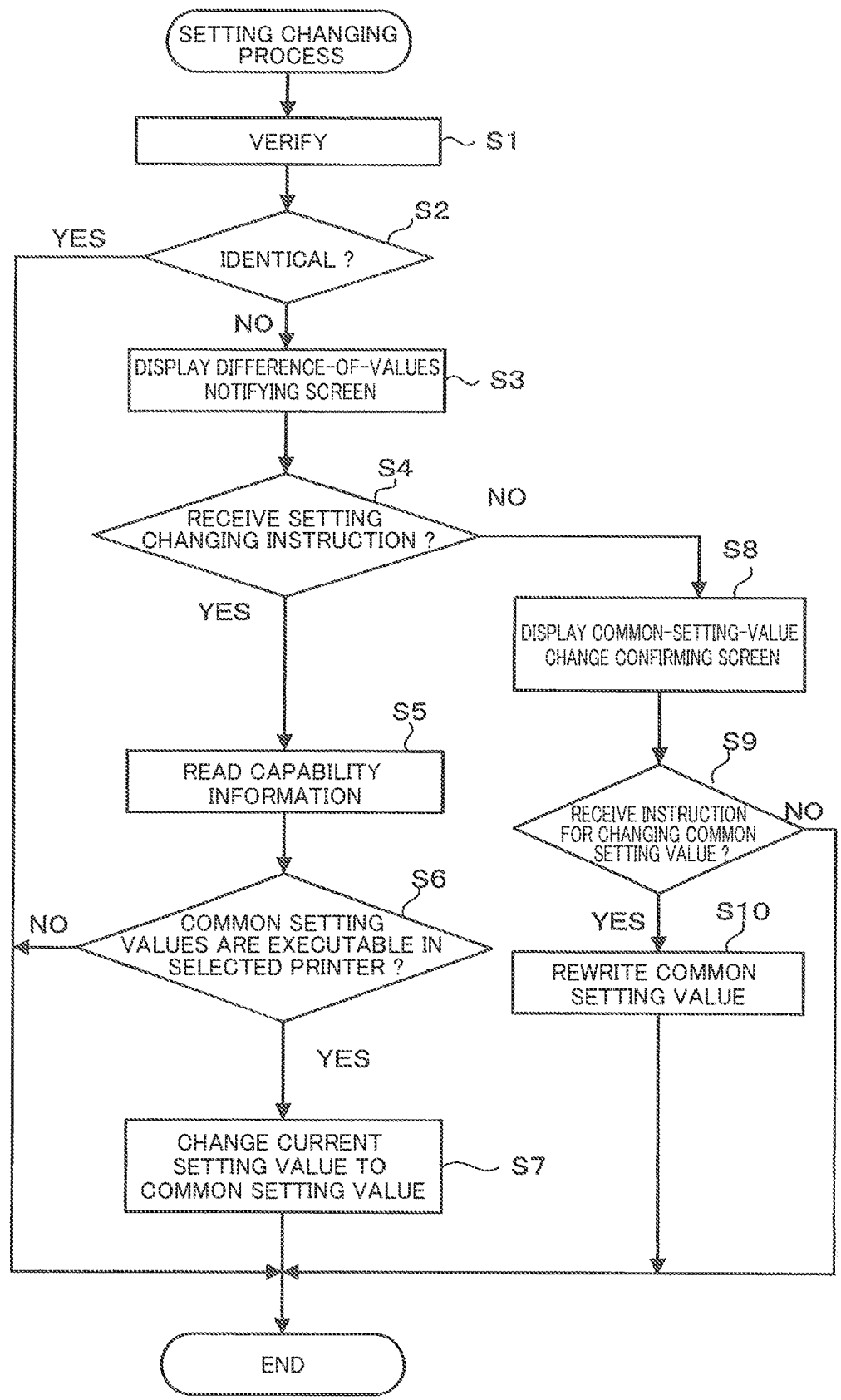
FIG. 5 is a flowchart illustrating an example of steps of a setting value changing process.
Figure 6A:
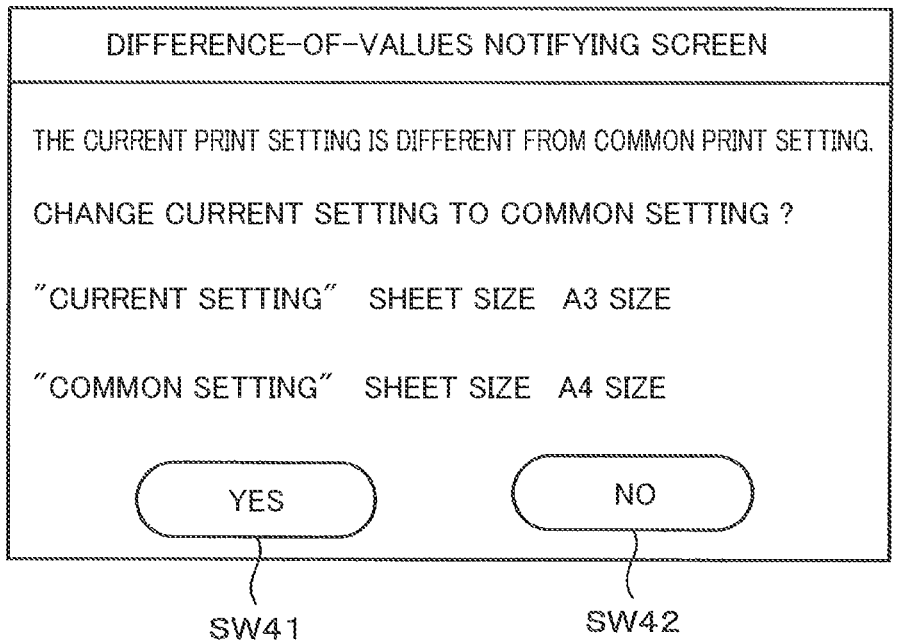
FIG. 6A is a view illustrating an example of a displaying screen.

As illustrated in FIG. 5, in a case where the CPU 11 determines that the setting values of the print setting are not identical with the common setting value, the CPU 11 displays, for example, a difference-of-values notifying screen D4 illustrated in FIG. 6A on the display 13a of the PC 1 at S3.

On the difference-of-values notifying screen D4 illustrated in FIG. 6A, a message that notifies a situation in which the setting values of the print setting that is currently set to the selected printer are different from the common setting values of the common setting file 45, and a message that confirms whether the setting values of the print setting that is currently set are to be changed to the common setting values or not are displayed. The difference-of-values notifying screen D4 may concretely display the setting values of the print setting that are not identical with each other between the current setting values of the print setting and the common setting values. The difference-of-values notifying screen D4 includes a YES button SW41 for an instruction for changing the print setting from the current setting values of the print setting to the common setting values, and a NO button SW42 for an instruction for not changing the print setting from the current setting values of the print setting to the common setting values. An operation to the YES button SW41 or the NO button SW42 is an example of a first input operation.

As illustrated in FIG. 5, the CPU 11 determines whether the instruction for changing the setting values of the print setting is received or not based on the operation to the YES button SW41 or the NO button SW42 at S4. The process at S4 is an example of a first receiving process.

In a case where the operation to the YES button SW41 on the difference-of-values notifying screen D4 is received via the user IF 13, the CPU 11 determines that the print setting is to be changed from the current setting values of the print setting to the common setting values of the common setting file 45 (S4: YES). In this case, the CPU 11 reads, at S5, the capability information obtained at A13 in FIG. 3. In a case where the memory 12 stores the capability information in the state in which the capability information and the printer information of the printer that is to be controlled are associated with each other, the CPU 11 may read the capability information from the memory 12.

At S6, the CPU 11 determines whether the common setting value of the common setting file 45 is executable or not by the printer identified at A21 in FIG. 3 based on the capability information read at S5. For example, suppose that the printer 2 and the printer 3 each connected to the PC 1 are printers capable of executing all the common setting values of the setting items illustrated in FIG. 2B, and the printer 4 is a printer not capable of executing color printing, but executing monochrome printing.

In a case where the selected printer is the printer 4, the CPU 11 determines that the common setting value "COLOR" set to the setting item "COLOR MODE" of the common setting file 45 is not executable by the printer 4 (S6: NO in FIG. 5) In this case, as illustrated in FIG. 5, the CPU 11 ends the setting changing process without changing the print setting from the current setting values set to the print queue 203 for the printer 4 illustrated in FIG. 2 to the common setting values. In this case, the CPU 11 may display a screen that notifies a situation in which the printer 4 is not capable of executing the common setting value of the print setting on the display 13a of the PC 1. At that time, the CPU 11 may urge the user to change the selected printer or change the common setting value.

In a case where the selected printer is the printer 3, since all the common setting values of the common setting file 45 are executable by the printer 3 (S6: YES in FIG. 5), as illustrated in FIG. 5, the CPU 11 changes the print setting from the current setting values to the common setting values at S7. For example, in the print queue 202 in FIG. 2A corresponding to the printer 3, the setting value "A4 SIZE" is set to the setting item "SHEET SIZE", the setting value "STANDARD (1 in 1)" is set to the setting item "PAGE-LAYOUT PRINTING", the setting value "OFF" is set to the setting item "SAVING PRINTING", and the setting value "INVALID" is set to the setting item "PIN SETTING". There setting values are different from the common setting values of the common setting file 45 in FIG. 2B. Accordingly, the CPU 11 changes the setting value of the setting item "SHEET SIZE" from the setting value "A3 SIZE" to the common setting value "A4 SIZE", which is one of the common setting values of the print setting stored in the print queue 202. As in the same manner, the setting values of the setting items "PAGE-LAYOUT PRINTING", "SAVING PRINTING" and "PIN SETTING" are respectively changed to the common setting value "2 in 1", "ON" and "VALID (1234)".

Suppose that the setting values of the print setting and the common setting values are not identical with each other, and the selected printer is the printer 2. In this case, the printer 2 is capable of executing all the common setting values of the common setting file 45. For example, only the setting value of the setting item "PAGE-LAYOUT PRINTING" of the print setting in the print queue 201 corresponding to the printer 2 in FIG. 2A is different from the common setting value of the setting item "PAGE-LAYOUT PRINTING" included in the common setting file 45. Accordingly, the CPU 11 changes the print setting stored in the print queue 201 from the setting value "4 in 1" of the setting item "PAGE-LAYOUT PRINTING" to the common setting value "2 in 1" of the setting item "PAGE-LAYOUT PRINTING".

As described above, both in the case where the printer 2 is selected and in the case where the printer 3 is selected, the common setting value is respectively reflected to the current setting value of the print setting set to the print queue 201, 202 at the timing of the selection of the printer. Accordingly, when the user hopes to set the common setting value to the print setting both in a case where printing is performed by using the printer 2 and in a case where printing is performed by using the printer 3, the user does not need to input, by hand, the common setting value to the general purpose printing setting screen D2.

On the other hand, in a case where the operation to the NO button SW42 on the difference-of-values notifying screen D4 illustrated in FIG. 6A is received via the user IF 13, the CPU 11 determines that the setting values of the print setting is not changed to the common setting values (S4: NO). In this case, the CPU 11 displays, for example, a common-setting-value change confirming screen D5 illustrated in FIG. 6B on the display 13a of the PC 1 at S8.

Figure 6B:
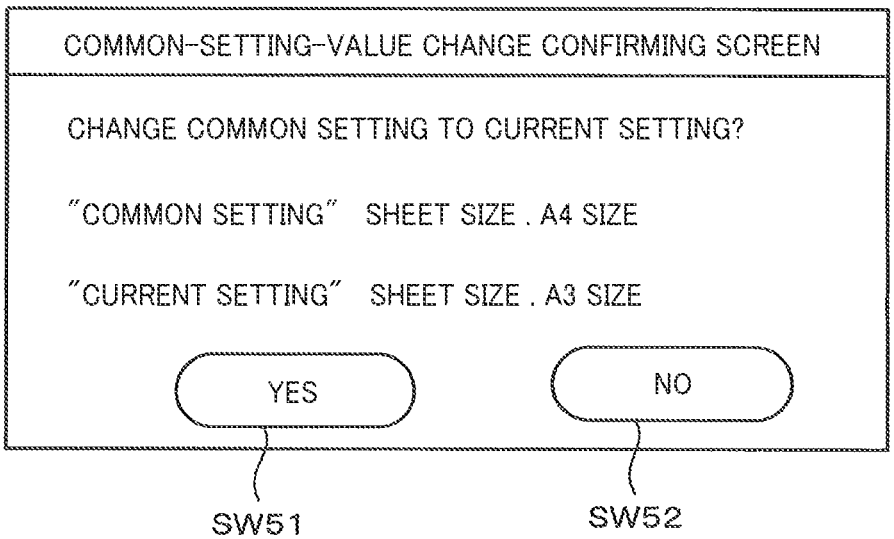
FIG. 6B is a view illustrating an example of a displaying screen.

The common-setting-value change confirming screen D5 illustrated in FIG. 6B displays a message that confirms whether the common setting values of the common setting file 45 are rewritten by the setting values that is currently set to the print setting or not. The setting values by which the common setting values are rewritten may be displayed on the common-setting-value change confirming screen D5. The common-setting-value change confirming screen D5 includes a YES button SW51 for an instruction for changing the print setting from the common setting values of the common setting file 45 to the current setting values and a NO button SW52 for an instruction for not changing the print setting from the common setting values of the common setting file 45 to the current setting values. The operation to the YES button SW51 or the NO button SW52 is an example of a second input operation.

As illustrated in FIG. 5, the CPU 11 determines whether the instruction for changing the common setting value is received or not based on the operation to the YES button SW51 or the NO button SW52 at S9. The process at S9 is an example of a second receiving process.

In a case where the operation to the YES button SW51 on the common-setting-value change confirming screen D5 illustrated in FIG. 6B is received via the user IF 13, the CPU 11 determines that the common setting values are to be changed (S9: YES). In the case where the printer 3 is selected, the CPU 11 changes the print setting by rewriting the common setting values of the common setting file illustrated in 45 FIG. 2B into the setting values of the print setting stored in the print queue 202 illustrated in FIG. 2A for the printer 3 at S10. That is, the supporting program 42 can easily change the common setting values based on the current setting values of the print setting without executing the common-setting-value setting process, which will be described below. Then, the CPU 11 ends the setting changing process. The process at S10 is an example of a rewriting process.

In this case, for example, in a case where the printer, that is a printer selected after the rewriting of the common setting values, is changed from the printer 3 to the printer 2, the setting values of the print setting set to the print queue 201 for the printer 2 is changed by the rewritten common setting values.

It is noted that in a case where the operation to the NO button SW52 on the common-setting-value change confirming screen D5 illustrated in FIG. 6B is received via the user IF 13, the CPU 11 determines that the common setting values are not to be changed (S9: NO), and ends the setting changing process.

Returning to FIG. 3, the supporting program 42 that executes the setting changing process transmits, to the general purpose printing program 41, a completion notification to the request for processing at A08 at A31. In this case, the supporting program 42 passes the current setting values of the print setting to the general purpose printing program 41. That is, for example, in a case where the setting values of the print setting is changed to the common setting values in the setting changing process, the supporting program 42 passes the changed setting values of the print setting together with the completion notification to the general purpose printing program 41. At A32, the general purpose printing program 41 causes the PC 1 to display information added to the completion notification on the general purpose printing setting screen D2 in response to receipt of the completion notification.

As described above, both in the case where the printer 2 is selected and in the case where the printer 3 is selected, the supporting program 42 can automatically change the print setting from the current setting values to the common setting values, and can pass the changed setting values of the print setting together with the completion notification to the general purpose printing program 41 in the setting changing process. As a result of this, both in the case where the printer 2 is selected and in the case where the printer 3 is selected, the general purpose printing program 41 can cause the PC 1 to display the general purpose printing setting screen D2 that reflects the common setting values. That is, both in the case where the printer 2 is selected and in the case where the printer 3 is selected, the common setting values are automatically displayed on the general purpose printing setting screen D2 without the input by hand by the user.

It is noted that the general purpose printing program 41 may not change the setting values of the setting items of the print setting which are not included in the common setting values, such as the setting item "SHEET TYPE", the setting item "SUPPLYING TRAY", the setting item "WATER MARK" and the setting item "STAPLING" illustrated in FIG. 2A, or may change to the setting values (initial values) set in the print queue for the selected printer.

Figure 7:
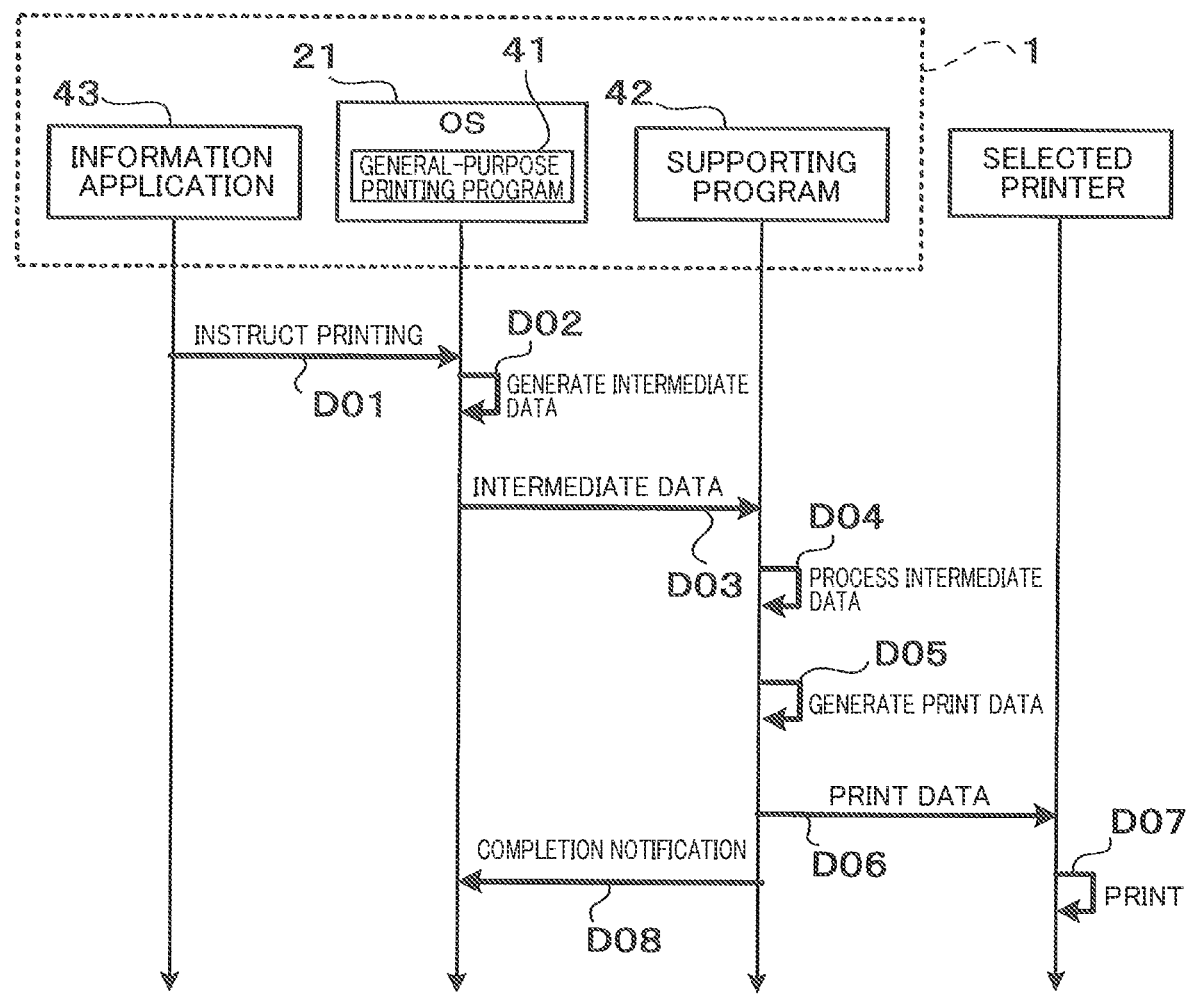
FIG. 7 is a sequence of steps performed in a case where a print instruction is received.

Next, there will be described steps of each of the programs performed in a case where an instruction for the print execution by operations of the user to the printing button SW3 is received while the general purpose print setting screen D2 illustrated in FIG. 4 is displayed, with reference to a sequence in FIG. 7. For example, the printing button SW3 is provided for the general purpose printing setting screen D2, and the print-setting screen D2 receives the instruction for the print execution by the operations to the printing button SW3. Since the general purpose printing setting screen D2 is displayed by the request from the information application 43, the operations to the general purpose printing setting screen D2 means that the information application 43 receives the operations. As a result of this, in the present embodiment, the instruction for the print execution is received by the information application 43, and a print instruction is outputted from the information application 43 to the general purpose printing program 41 in response to receipt of the instruction for the print execution. It is noted that the information application 43 may directly receive the instruction for the print execution independently of the general purpose printing setting screen D2. Also in this case, the print instruction is outputted from the information application 43 to the general purpose printing program 41 in response to receipt of the instruction.

The general-purpose printing program 41 receives the instruction for the print execution by the user at D01, generates, at D02, the intermediate data by converting a data format of the information screen received from the information application 43 into a data format of the intermediate data by using the print setting received in the general purpose print setting screen D2, and passes the generated intermediate data to the supporting program 42 at D03. There are various kinds of formats of the image data included in the information application 43, and the general-purpose printing program 41 converts the image data of the image to be displayed into the intermediate data suitable for generating the print data. It is noted that, in a case where the image data of the image to be displayed is data suitable for generating the print data, the image data itself may become the intermediate data without being converted into the intermediate data. The intermediate data is, for example, XPS data.

At D04, the supporting program 42 processes the intermediate data received at D03 such that the setting values of the setting items of the print setting are reflected. The supporting program 42 executes rasterizing to the processed intermediate data and generates the print data indicating the image to be displayed at D05. The print data generated at D05 is data having a format usable in printing by the selected printer, for example, PDL data solely dedicated to the model of the selected printer.

Rasterizing by the supporting program 42 conforming to the selected printer gives the selected printer a large amount of flexibility and allows the supporting program 42 to generate the print data suitable for printing by the selected printer when compared with rasterizing by the general-purpose printing program 41. It is noted that the print data generated by the supporting program 42 may be data having a format usable in printing by printers other than the model of the selected printer.

The supporting program 42 transmits, to the selected printer, the print data generated at D05 together with a printing command for instructing the print execution at D06. The process performed at D06 is an example of a transmitting process. In a case where there is an image process which is determined to cause the selected printer to execute, the supporting program 42 generates the printing command including information of the image process. Further, the supporting program 42 may notify, at D08, to the general-purpose printing program 41 that the transmission of the print data is completed.

When receiving the print data and the printing command, the selected printer performs printing of an image of the print data based on the received printing command at D07. As a result of this, the printed object is generated.

It is noted that the general-purpose printing program 41 may generate the print data instead of the supporting program 42. For example, the supporting program 42 may pass the intermediate data processed at D03 and the information of the print execution to the general-purpose printing program 41, and the general-purpose printing program 41 may generate the print data by rasterizing the intermediate data. In this case, the general-purpose printing program 41 passes the generated print data to the supporting program 42. Then, in a case where the supporting program 42 receives the print data from the general-purpose printing program 41, the supporting program 42 transmits, to the selected printer, the print data received from the general-purpose printing program 41 together with the printing command for instructing the print execution.

The print data generated by the general-purpose printing program 41 is print data having a format usable in printing by various kinds of printers, for example, PWGRaster data or PDF data. Rasterizing by the general-purpose printing program 41 allows the supporting program 42 to reduce an amount of processing. As a result of this, it is possible to reduce the processing time by the supporting program 42. Moreover, it is possible to reduce the program size of the supporting program 42.

It is noted that the general-purpose printing program 41 may transmit the print data and the printing command to the selected printer. That is, the supporting program 42 may pass the generated print data to the general-purpose printing program 41 such that the print data is transmitted from the PC 1 to the selected printer as the destination. In this case, the general-purpose printing program 41 transmits the print data received from the supporting program 42 and so on to the selected printer. In this case, the process in which the supporting program 42 passes the print data and so on to the general-purpose printing program 41 is an example of the transmitting process.

Next, there will be described steps for setting the common setting values with reference to a flowchart illustrated in FIG. 8A. The common setting values are set by using a common-setting-value setting screen D3 illustrated in FIG. 8B. The common-setting-value setting screen D3 is displayed by the supporting program 42. For example, the supporting program 42 has an executable file for setting the common setting values, and when the PC 1 receives an instruction for performing the executable file, the CPU 11 starts the common-setting-value setting process illustrated in FIG. 8A.

Figure 8A:
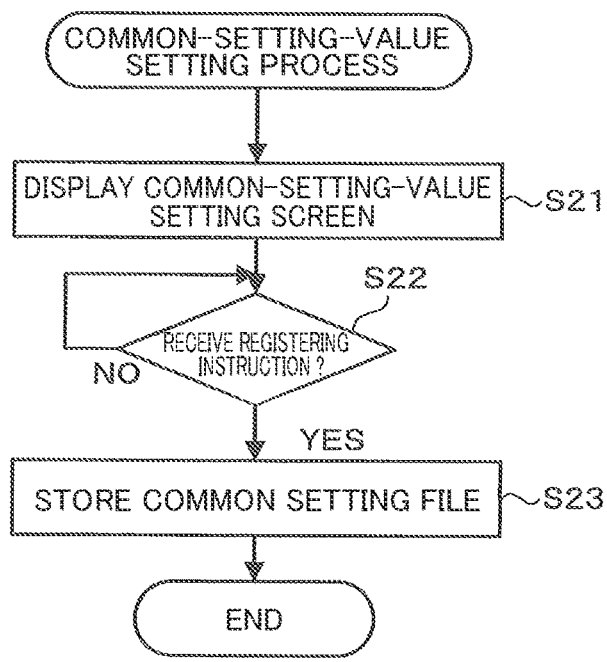
FIG. 8A is a flowchart illustrating a common-setting-value setting process.
Figure 8B:
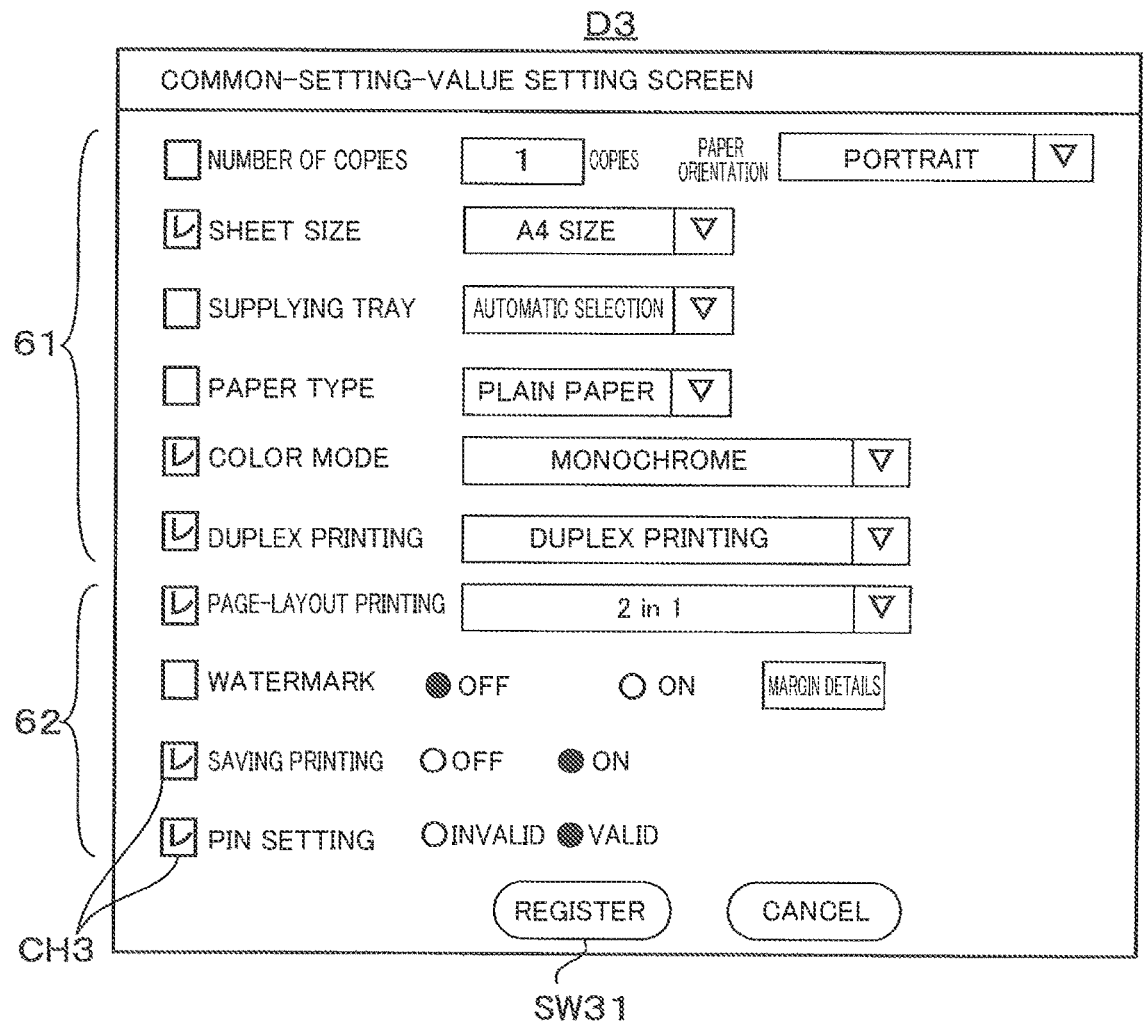
FIG. 8B is a view illustrating an example of a common-setting-value setting screen.

First, the CPU 11 displays the common-setting-value setting screen D3 illustrated in FIG. 8B on the display 13a of the PC 1 at S21, and the CPU 11 determines whether a registering instruction is received or not at S22. The common-setting-value setting screen D3 illustrated in FIG. 8B is a screen that receives an input of the common setting values. A plurality of setting items to which the common setting values are respectively set are displayed on the common-setting-value setting screen D3. The plurality of setting items to which the common setting values are respectively set include setting items 61 which are standard setting items and dedicated setting items 62 which are setting items dedicated to the printer, as illustrated in FIG. 8B. The common-setting-value setting screen D3 can display a plurality of parameters for each of the plurality of setting items so as to be selectable. The common-setting-value setting screen D3 includes check boxes CH3, for each of the plurality of setting items, for determining whether the common setting values of the checked setting items are set to the setting items of the print setting or not. The common-setting-value setting screen D3 includes a registering button SW31 for an instruction for registering the common setting values inputted to the common-setting-value setting screen D3 into the memory 12. The common-setting-value setting screen D3 is an example of a setting screen. The process at S21 is a setting process.

In a case where the registering button SW31 is not operated via the user IF 13, the CPU 11 determines that the registering instruction is not received (S22: NO), the CPU 11 keeps the situation in which the common-setting-value setting screen D3 is displayed. In a case where the registering button SW31 is operated via the user IF 13, the CPU 11 determines that the registering instruction is received (S23: YES). In this case, the CPU 11 generates the common setting file 45 based on the common setting values inputted to the common-setting-value setting screen D3, and stores the common setting file 45 into the memory 12 at S23. The process at S23 is an example of a storing process.

For example, the CPU 11 makes the setting items, the check boxes CH3 of which are checked, such as the setting item "SHEET SIZE" and the setting item "COLOR MODE" illustrated in FIG. 8B, setting items to which the common setting values are to be set. The CPU 11 writes the parameters which are set to the setting items to be set, as the common setting values, into the common setting file 45. For example, the CPU 11 writes the common setting value of the setting item "SHEET SIZE" as the setting value "A4 SIZE" into the common setting file 45. As in the same manner, the CPU 11 writes the setting value "COLOR" of the setting item "COLOR MODE", the setting value "DUPLEX PRINTING" of the setting item "DUPLEX PRINTING", the setting value "2 in 1" of the setting item "PAGE-LAYOUT PRINTING", the setting value "ON" of the setting item "SAVING PRINTING", and the setting value "VALID (1234)" of the setting item "PIN SETTING" into the common setting file 45 as the common setting values.

By contrast, the CPU 11 does not make the setting items, the check boxes CH3 of which are not checked, such as the setting item "SHEET TYPE" and the setting item "SUPPLYING TRAY" illustrated in FIG. 8B, setting items to which the common setting value are to be set. In the present embodiment, the setting items, the check boxes of which are not checked, that are setting items to which the common setting values are not to be set, are not written into the common setting file 45, however, information indicating that the common setting values are not set to the setting items may be written into the common setting file 45. The CPU 11 stores, into the memory 12, the common setting file 45 into which the common setting values are written, and the CPU 11 ends the common-setting-value setting process.

As described above, the supporting program 42 of the present embodiment sets the plurality of printers 2, 3, 4 connected to the PC 1 as printers to be controlled, and the supporting program 42 is activated even when any one of the printers 2, 3, 4 is requested to perform the process, that is, when any one of the print queues respectively corresponding to the printers 2, 3, 4 is selected. The activated supporting program 42 reads the common setting file 45 from the memory 12, and changes the print setting from the setting values currently set to the printers 2, 3, 4 to the common setting values written into the common setting file 45. Accordingly, in the PC 1 using the general purpose printing program 41 of the OS 21, it is possible to set the common print setting to the print setting in each of the printers 2, 3, 4 each conforming the supporting program 42 by the common setting file 45 which is prepared in advance by the user. Therefore, it is possible to reduce time to set the common setting values to the print setting in each of the printers 2, 3, 4 from the PC 1.

It is noted that, in a case where the printer which is not supported by the supporting program 42 is connected to the PC 1 and there is the print queue for the not-supported printer, the setting values of the print setting in the printer queue are not changed by the supporting program 42. That is, in a case where there is the plurality of printers each supported by the supporting program 42, the supporting program 42 changes the setting values of the print setting in the print queue for each of the plurality of printers each supported by the supporting program 42 by using the common setting file 45.

Moreover, the supporting program 42 of the present embodiment causes the print setting to reflect the common setting value at the timing of the selection of the printer. Accordingly, the result of the reflection is displayed on the general purpose printing setting screen D2 displayed by the general purpose printing program 41 or on a screen displayed by the information application 43 and so on. Therefore, the user can check the common setting values before inputting the print instruction.

Second Embodiment

Figure 9:
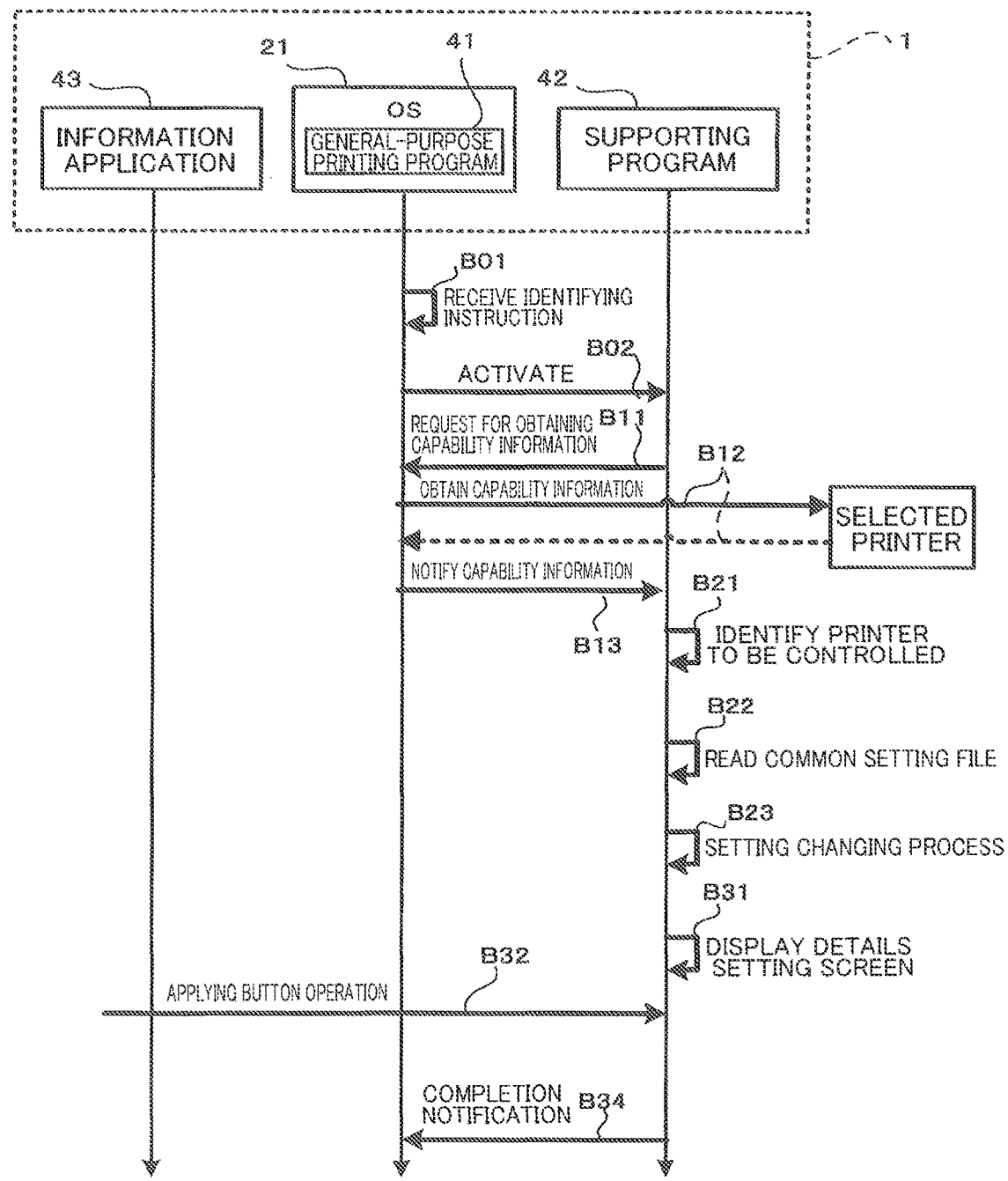
FIG. 9 is a sequence of steps performed in a case where an instruction for displaying a details setting screen is received.

Next, there will be described a second embodiment disclosed in the present application. FIG. 9 is a sequence of steps performed in a case where an instruction for displaying a details setting screen is received. The present embodiment changes the print setting from the setting values to the common setting values at the timing of the displaying of the details setting screen. In this point, the second embodiment is different from a first embodiment in which the setting value of the print setting is changed at the timing of the selection of the printer. That is, in the present embodiment, the processes at A21-A23 in FIG. 3 is not executed at the timing of the selection of the printer. Here, there will be mainly described the configuration different from the first embodiment, the same reference numerals as used in the first embodiment are used to designate the corresponding elements and processes of the second embodiment and a detailed explanation of the second embodiment is dispensed with.

As illustrated in FIG. 9, for example, in a case where an identifying instruction is received, at B01, by the operation from the user to the detailed setting button SW2 in a state in which the general purpose printing setting screen D2 in FIG. 4 is displayed, the general purpose printing program 41 activates the supporting program 42 and requests for processing at B02. At B02, the supporting program 42 receives the print setting received via the general purpose print setting screen D2 from the general purpose printing program 41.

The supporting program 42 obtains the capability information of the selected printer at B11-B13. Since the processes at B11-B13 are the same as the processes at A11-A13 in FIG. 2, the explanation of which is dispensed with. The process at B13 is an example of an obtaining process. It is noted that, in a case where the supporting program 42 has obtained the capability information and has stored the capability information in the memory 12 at the timing of the selection of the printer, the supporting program 42 may reads the capability information from the memory 12 without performing the processes at B11-B13.

At B21, the supporting program 42 that obtains the capability information identifies the printer which is requested to process, the supporting program 42 reads the common setting file 45 from the memory 12 at B22, and executes the setting changing process at B23. Since the processes at B21, B22, B23 are the same as the processes at A21, A22, A23 in FIG. 3, the explanation of which is dispensed with. The process at B21 is an example of an identifying process, the process at B22 is an example of a reading process, and the process at B23 is an example of a changing process.

The supporting program 42 that executes the setting changing process displays the details setting screen on the display 13a of the PC 1 at B31. In a case where the setting value of the print setting is changed to the common setting value at B23, the changed setting values of the print setting are respectively displayed automatically in the setting items on the details setting screen, that is, the setting values that reflect the common setting values are respectively displayed in the setting items of the print setting. The details setting screen includes an applying button that sets the print setting by the setting values received via the details setting screen. When an operation to the applying button is received via the user IF 13 at B32, the supporting program 42 passes the completion notification to the request for processing illustrated in B02 to the general purpose printing program 41 at B34. The general purpose printing program 41 may reflect, or may not reflect the print setting received via the details setting screen to the general purpose printing setting screen D2. That is, the common setting values may be displayed or may not displayed in the setting items of the print setting on the general purpose printing setting screen D2.

As in the same manner as the first embodiment, the supporting program 42 of the present embodiment executes the setting changing process at the timing of the receipt of the identifying instruction on the general purpose printing setting screen D2 displayed by the general purpose printing program 41. Accordingly, the print setting set to the printer queue for the selected printer reflects the common setting values of the common setting file 45. As a result of this, in the PC 1 using the general purpose printing program 41 of the OS 21, it is possible to set the common print setting to the print setting in each of the printers 2, 3, 4 each conforming the supporting program 42 by the common setting file 45 which is prepared in advance by the user. Therefore, it is possible to reduce time to set the common setting values to the print setting in each of the printers 2, 3, 4 from the PC 1. Moreover, the supporting program 42 of the present embodiment can reflect the common setting values based on the operation to the detailed setting button SW2 via the general purpose printing setting screen D2 at an arbitrary timing of the user.

Third Embodiment

Figure 10:
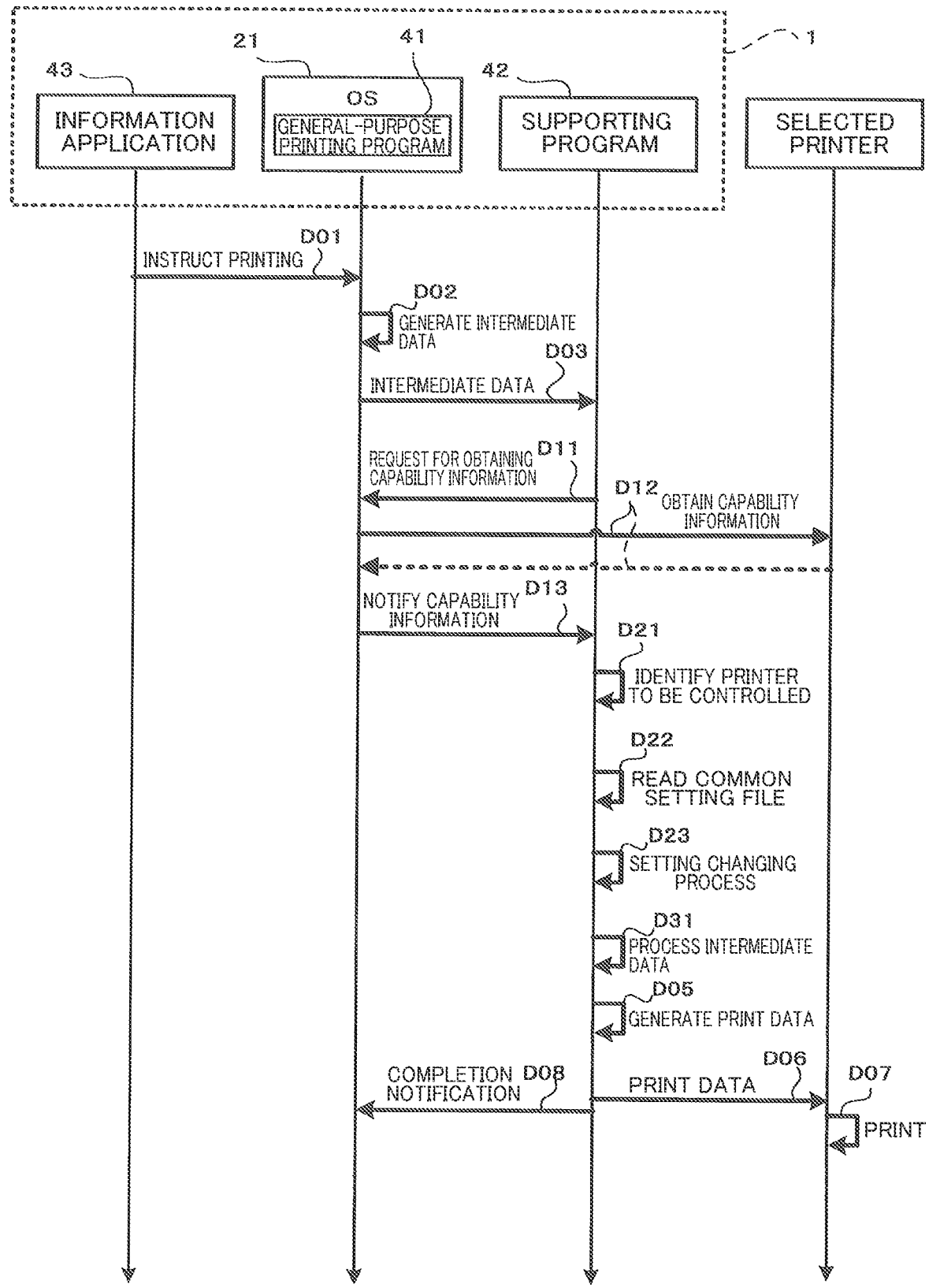
FIG. 10 is a sequence of steps performed in a case where the print instruction is received.

Next, there will be described a third embodiment disclosed in the present application. FIG. 10 is a sequence of steps performed in a case where the print instruction is received. In the present embodiment, the setting values of the print setting are changed to the common setting values at the timing of the receipt of the print instruction. In this point, the third embodiment is different from the first embodiment in which the setting values of the print setting are changed at the timing of the selection of the printer. That is, in the present embodiment, the processes at A21-A23 in FIG. 3 is not executed at the timing of the selection of the printer. Here, there will be mainly described the configuration different from the first embodiment, the same reference numerals as used in the first embodiment are used to designate the corresponding elements and processes of the third embodiment and a detailed explanation of the third embodiment is dispensed with.

As illustrated in FIG. 10, for example, in a case where the print instruction is received, at D01, by the operation of the user to the printing button SW3 in a state in which the printer corresponding to the supporting program 42 is selected on the general purpose printing setting screen D2 in FIG. 4, the general purpose printing program 41 generates the intermediate data at D02, the general purpose printing program 41 activates the supporting program 42, and passes the intermediate data to the supporting program 42 at D03. At D03, the general purpose printing program 41 passes the print setting received via the general purpose printing setting screen D2 to the supporting program 42.

The activated supporting program 42 obtains the capability information indicating capability of the selected printer at D11-D13. Since the processes at D11-D13 are the same as the processes at A11-A13 in FIG. 2, the explanation of which is dispensed with. The process at D13 is an example of a capability obtaining process. It is noted that, in a case where the supporting program 42 has obtained the capability information and has stored the capability information in the memory 12 at the timing of the selection of the printer, the supporting program 42 may reads the capability information from the memory 12 without performing the processes at D11-D13.

At D21, the supporting program 42 that obtains the capability information identifies the printer which is requested to process, the supporting program 42 reads the common setting file 45 from the memory 12 at D22, and executes the setting changing process at D23. Since the processes at D21, D22, D23, are the same as the processes at A21, A22, A23 in FIG. 3, the explanation of which is dispensed with. The process at D21 is an example of an identifying process, the process at D22 is an example of a reading process, and the process at D23 is an example of a changing process.

The supporting program 42 that executes the setting changing process processes the intermediate data at D31. At that time, in a case where the setting values of the print setting set on the general purpose print setting screen D2 are changed to the common setting values, the supporting program 42 processes the intermediate data based on the setting values which reflects the common setting values. The supporting program 42 generates the print data based on the processed intermediate data at D05, the supporting program 42 transmits the generated print data to the selected printer at D06, and causes the selected printer to print at D07.

As in the same manner as the first embodiment, the supporting program 42 of the present embodiment executes the setting changing process at the timing of the receipt of the print instruction. Accordingly, the print setting reflects the common setting values of the common setting file 45. As a result of this, in the PC 1 using the general purpose printing program 41 of the OS 21, it is possible to set the common print setting to the print setting in each of the printers 2, 3, 4 each conforming the supporting program 42 by the common setting file 45 which is prepared in advance by the user. Moreover, the supporting program 42 of the present embodiment can use the common setting values on every printing occasion. Accordingly, the printing by the common setting values is more utilized.

Moreover, in the present embodiment, since the change to the common setting values is performed after the input of the print instruction, the setting values cannot be changed by hand after the setting values of the print setting are automatically changed to the common setting values. Accordingly, according to the present embodiment, it is possible to certainly perform printing by using the common setting value in the plurality of printers. By contrast, in a case where the common setting values are changed at the timing of the selection of the printer before the receipt of the print instruction as in the first embodiment, or in a case where the common setting values are changed at the timing of the displaying of the details setting screen before the receipt of the print instruction as in the second embodiment, since the setting values can be changed by hand after the setting values of the print setting are automatically changed to the common setting value, it is possible to customize the print setting in individual cases of printing.

It is noted that the embodiments disclosed in the present disclosure are merely described by way of examples, and do not limit the present disclosure. Accordingly, the technical features disclosed in the present disclosure may be embodied with various changes and modifications, which may occur to those skilled in the art, without departing from the spirit and scope of the disclosure. For example, the device connected on the PC 1 is not limited to the printers, and may be an apparatus having a printing function such as a multifunction peripheral, a copying apparatus, a facsimile apparatus. Moreover, a number of printers connected to the PC 1 is not limited to the example illustrated in drawings, may be two or more.

Moreover, the processes at S4, and S8-S10 in FIG. 5 may be omitted. However, in a case where the print setting is changed to the common setting values at the timing of the receipt of the print instruction, there is a possibility that the unintended printing to the user occurs. Accordingly, the supporting program 42 may inquire whether the user hopes to change the setting values of the print setting or not, and may change the print setting to the common setting values in response to receipt of an input indicating an agreement to the change to the common setting values of the print setting from the user. In this case, it is possible to avoid the occurrence of the unintended printing.

Moreover, the processes at S8-S10 may be omitted in a case where the instruction for changing the setting value is not received at S4 in FIG. 5 (S4: NO). However, in a case where the print setting is not changed to the common setting values, the supporting program 42 may inquire whether the user hopes to change the common setting values in the common setting file 45 or not, and may change the common setting values in the common setting file 45 to the current setting values of the print setting when in response to receipt of an input indicating an agreement to the change to the current setting values of the print setting from the user. Accordingly, in this case, it is possible to commonly use the setting values of the print setting from then on.

Moreover, the processes at S5 and S6 in FIG. 5 may be omitted. However, the supporting program 42 may determine whether the selected printer can perform printing by using the common setting values or not based on the capability information obtained from the selected printer. In a case where the selected printer cannot perform printing by using the common setting values, the supporting program 42 may not change the print setting to the common setting values. In this case, it is possible to avoid a malfunction in which an error occurs in the printer.

Moreover, the common-setting-value setting process illustrated in FIG. 8A may be omitted, and the common setting values in the common setting file 45 may be set to a fixed value. Moreover, a program different from the supporting program 42 may display the common-setting-value setting screen D3, and may receive setting of the common setting values. However, in a case where the supporting program 42 provides the common-setting-value setting screen D3 on which the user writes the common setting values into the common setting file 45, the user can easily edit the common setting values.

Moreover, the check boxes CH3 may be omitted on the common-setting-value setting screen D3 illustrated in FIG. 8B, and the supporting program 42 may allow the user to select whether the common setting values of all the setting items of the print setting are to be written into the common setting file 45 at one time or not. However, in the above described embodiments, since the user can select whether the setting common values are to be written into the setting data of the common setting file 45 for each of the setting items of the print setting, the supporting program 42 can discriminate between the setting items commonly used and the setting items not commonly used based on the setting data. Accordingly, it is possible to increase flexibility of effective use.

Moreover, the general purpose printing program 41 may provide a common setting button on the general purpose printing setting screen D2 that causes the print setting to reflect the common setting values, and may receive the identifying instruction in response to an operation to the common setting button.

Moreover, the common-setting-value setting screen D3 illustrated in FIG. 8B may not include standard setting items indicated by the setting items 61, the supporting program 42 may set the common setting values only to the setting items dedicated to the printer, and may cause the print setting to reflect the common setting values only to the setting items dedicated to the printer. The supporting program 42 may set the common setting values only to the standard setting items in the above described same manner.

Moreover, in the embodiments, as the operations of the supporting program 42, only printing operations are described in detail, however, the supporting program 42 may have other functions. Moreover, the program executing the processes of the embodiments is not limited to the supporting program 42, and the program may be a program that receives an instruction from the OS 21 or the general-purpose printing program 41 when executing printing by using the general-purpose printing program 41. For example, the program may be a printing workflow application what is called Print Workflow, the specification of which is published by Microsoft.

Moreover, the execution timing of the supporting program 42 is not limited to the example of the embodiments. For example, the supporting program 42 may be executed by a direct instruction for executing from the OS 21, or the supporting program 42 may be a resident program. In a case the supporting program is the resident program, the supporting program 42 may perform the above described operations when receiving an execution command.

Moreover, in the any flowcharts disclosed in the embodiments, the execution order of the plurality of processes in the plurality of any steps may be changed or the plurality of processes may be executed in parallel as far as a contradiction of the processes does not occur.

Moreover, the processes disclosed in the embodiments may be executed by hardware such as a single CPU, a plurality of CPUs, an ASIC, and a combination of the CPU, the plurality of CPUs and the ASIC. Moreover, the processes disclosed in the embodiments may be embodied by various kinds of embodiments such as a storage medium storing a program executing the processes, an apparatus including the storage medium and methods.

What is claimed is:

1. A non-transitory storage medium storing a supporting program executable by a computer of an information processing apparatus,
   wherein the supporting program is configured to support a printing program of an operating system of the information processing apparatus, the supporting program conforming to a printer connected to the information processing apparatus,
   wherein the information processing apparatus is capable of controlling a plurality of printers,
   wherein a print queue for each of the plurality of printers, which are to be controlled, is provided in the operating system,
   wherein the printing program of the operating system is capable of making a request to the supporting program for processing in a state in which the print queue for any one of the plurality of printers is selected,
   wherein, when executed by the computer, the supporting program causes the information processing apparatus to execute:
      when being requested for processing from the printing program of the operating system,
         identifying the printer of the plurality of printers to which the processing is requested,
         reading setting data into which a common setting value indicating a setting value of a print setting commonly used by the plurality of printers is written, and
         changing a setting value of the print setting of the identified printer based on the common setting value which has been written into the read setting data.

2. The non-transitory storage medium according to claim 1,
   wherein, the supporting program causes the information processing apparatus to execute the identifying, the reading and the changing when the processing is requested from the printing program of the operating system in response to selection of the identified printer.

3. The non-transitory storage medium according to claim 1,
   wherein the printing program of the operating system is capable of displaying a print setting screen on a display of the information processing apparatus, the print setting screen being capable of receiving a particular instruction indicating a request for the processing to the supporting program, and wherein the supporting program causes the information processing apparatus to execute the identifying, the reading and the changing when the processing is requested from the printing program of the operating system in response to receipt of the particular instruction via the print setting screen.

4. The non-transitory storage medium according to claim 1, wherein the supporting program causes the information processing apparatus to execute the identifying, the reading and the changing when the processing is requested for processing from the printing program of the operating system in response to receipt of a printing instruction, outputted from an application program installed on the information processing apparatus to the printing program of the operating system, for causing the printing program of the operating system to print.

5. The non-transitory storage medium according to claim 1, wherein, when executed by the computer, the supporting program causes the information processing apparatus to execute receiving a first input operation via a user interface of the information processing apparatus in a case where the common setting value written into the read setting data and the setting value of the print setting corresponding to the identified printer are different from each other, the first input operation being an input operation indicating whether the setting value of the print setting corresponding to the identified printer is changed or not, wherein the supporting program causes the information processing apparatus to execute the changing when the first input operation indicating that the setting value of the print setting corresponding to the identified printer is changed is received, and wherein the supporting program causes the information processing apparatus not to execute the changing when the first input operation indicating that the setting value of the print setting of the identified printer is not changed is received.

6. The non-transitory storage medium according to claim 5, wherein, when executed by the computer, the supporting program causes the information processing apparatus to execute:

receiving a second input operation via the user interface of the information processing apparatus in response to receipt of the first input operation indicating that the setting value of the print setting of the identified printer is not changed, the second input operation being an input operation indicating whether the common setting value is changed or not, and rewriting the setting value of the print setting corresponding to the identified printer into the common setting value written into the read setting data in response to receipt of the second input operation indicating that the common setting value is changed.

7. The non-transitory storage medium according to claim 1, wherein, when executed by the computer, the supporting program causes the information processing apparatus to execute obtaining capability information indicating capability of the printer when being requested for processing from the printing program of the operating system, wherein, in the changing, the setting value of the print setting corresponding to the identified printer is changed based on the common setting value written into the read setting data when the common setting value is executable by capability indicated by the obtained capability information, and wherein, in the changing, the setting value of the print setting corresponding to the identified printer is not changed based on the common setting value written into the read setting data when the common setting value is not executable by the capability indicated by the obtained capability information.

8. The non-transitory storage medium according to claim 1, wherein, when executed by the computer, the supporting program causes the information processing apparatus to execute:

displaying a common-setting-value setting screen on the display of the information processing apparatus, the common-setting-value setting screen being configured to receive an input of the common setting value, and storing, into a memory of the information processing apparatus, the setting data into which the common setting value inputted via the common-setting-value setting screen is written, and wherein, in the reading, the stored setting data is read.

9. The non-transitory storage medium according to claim 8, wherein, in the displaying, the common-setting-value setting screen capable of receiving (i) determination of whether the common setting value is set to each of a plurality of items of the print setting and (ii) an input of the common setting value of each of the plurality of items of the print setting is displayed on the display of the information processing apparatus, and wherein, in the storing, the common setting value of the plurality of items of the print setting inputted via the common-setting-value setting screen is written into the setting data, the common setting value of each of the setting items being determined to be set.

10. The non-transitory storage medium according to claim 1, wherein, when executed by the computer, the supporting program causes the information processing apparatus to execute:

when being requested for processing from the printing program of the operating system in response to receipt of the printing instruction, outputted from an application program installed on the information processing apparatus to the printing program of the operating system, for causing the printing program of the operating system to print an image, obtaining image data indicating the image from the printing program of the operating system, and transmitting a printing command to the printer based on the image data.

* * * * *